(12) United States Patent
Leigh et al.

(10) Patent No.: US 9,645,337 B2
(45) Date of Patent: May 9, 2017

(54) CONNECTOR MODULES TO OPTICALLY CONNECT TO ELECTRONIC DEVICES

(71) Applicant: HEWLETT PACKARD ENTERPRISE DEVELOPMENT LP, Houston, TX (US)

(72) Inventors: Kevin B. Leigh, Houston, TX (US); George D. Megason, Spring, TX (US); David W. Sherrod, Tomball, TX (US); Christopher C. Wanner, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/942,415

(22) Filed: Nov. 16, 2015

(65) Prior Publication Data

US 2016/0070077 A1   Mar. 10, 2016

Related U.S. Application Data

(63) Continuation of application No. 14/361,185, filed as application No. PCT/US2012/020438 on Jan. 6, 2012, now Pat. No. 9,213,157.

(51) Int. Cl.
| | | |
|---|---|---|
| *G02B 6/42* | (2006.01) | |
| *H04B 10/27* | (2013.01) | |
| *H04B 10/278* | (2013.01) | |
| *G02B 6/44* | (2006.01) | |
| *H04B 10/00* | (2013.01) | |

(Continued)

(52) U.S. Cl.
CPC ......... *G02B 6/4292* (2013.01); *G02B 6/3897* (2013.01); *G02B 6/43* (2013.01); *G02B 6/4452* (2013.01); *H04B 10/22* (2013.01); *H04B 10/225* (2013.01); *H04B 10/271* (2013.01); *H04B 10/278* (2013.01); *Y10T 29/49826* (2015.01)

(58) Field of Classification Search
CPC .. G02B 6/4292; G02B 6/4452; G02B 6/3897; G02B 6/43; H04B 10/271; H04B 10/278; H04B 10/225; H04B 10/22
See application file for complete search history.

(56) References Cited

U.S. PATENT DOCUMENTS

| 5,796,896 A | 8/1998 | Lee |
|---|---|---|
| 5,883,998 A | 3/1999 | Stevens |
| 5,953,473 A | 9/1999 | Shimotsu |

(Continued)

FOREIGN PATENT DOCUMENTS

| CN | 1836181 | 9/2006 |
|---|---|---|
| WO | WO-2011081620 | 7/2011 |

OTHER PUBLICATIONS

Hewlett-Packard Development Company, L.P., International patent application, PCT/US12/20434, entitled "Connector Modules Having Optical Connectors Moveable Between a Retracted Position and an Extended Position", filed Jan. 6, 2012 (24 pages).

(Continued)

*Primary Examiner* — Ryan Lepisto
(74) *Attorney, Agent, or Firm* — Trop, Pruner & Hu, P.C.

(57) ABSTRACT

A modular connector infrastructure includes device connector modules having optical connectors to optically connect to respective subsets of electronic devices in a system. The device connector modules are removably connected to the electronic devices.

13 Claims, 10 Drawing Sheets

(51) Int. Cl.
*G02B 6/38* (2006.01)
*G02B 6/43* (2006.01)

(56) References Cited

U.S. PATENT DOCUMENTS

| | | |
|---|---|---|
| 6,305,848 B1 | 10/2001 | Gregory |
| 6,371,657 B1 | 4/2002 | Chen |
| 6,623,177 B1 | 9/2003 | Chilton |
| 6,733,183 B2 | 5/2004 | Gregory |
| 6,822,874 B1 * | 11/2004 | Marler ............... H05K 7/1452 361/724 |
| 7,284,911 B2 | 10/2007 | Takedam |
| 7,588,373 B1 | 9/2009 | Sato |
| 7,623,749 B2 | 11/2009 | Reagan |
| 2003/0180004 A1 | 9/2003 | Cox |
| 2004/0179787 A1 | 9/2004 | Glazowski |
| 2005/0069262 A1 | 3/2005 | Roth |
| 2005/0111809 A1 | 5/2005 | Giraud |
| 2005/0271328 A1 | 12/2005 | Ohtsu |
| 2006/0093301 A1 | 5/2006 | Zimmel |
| 2006/0153503 A1 | 7/2006 | Suzuki |
| 2008/0101757 A1 | 5/2008 | Lin |
| 2008/0239687 A1 | 10/2008 | Leigh |
| 2010/0067854 A1 | 3/2010 | Oki |
| 2010/0226610 A1 | 9/2010 | Kobayashi |
| 2010/0241913 A1 | 9/2010 | Sheth |
| 2010/0254667 A1 | 10/2010 | He |
| 2011/0116755 A1 | 5/2011 | Rolston |
| 2014/0334783 A1 | 11/2014 | Megason |

OTHER PUBLICATIONS

Hewlett-Packard Development Company, L.P., International patent application, PCT/US12/20438, entitled "Connector Modules to Optically Connect to Electronic Devices", filed Jan. 6, 2012 (25 pages).
International Searching Authority, The International Search Report and the Written Opinion for PCT/US2012/020438, Jul. 31, 2012, 9 Pages.
Motorola Inc., Model GX2 Omnistar, "Optical Broadband Transmission Platform", Advanced Media Technologies, 2004, Deerfield Beach, FL (2 pages).
The International Bureau of WIPO, International Preliminary Report on Patentability for PCT/US2012/020438 dated Jul. 17, 2014 (6 pages).

* cited by examiner

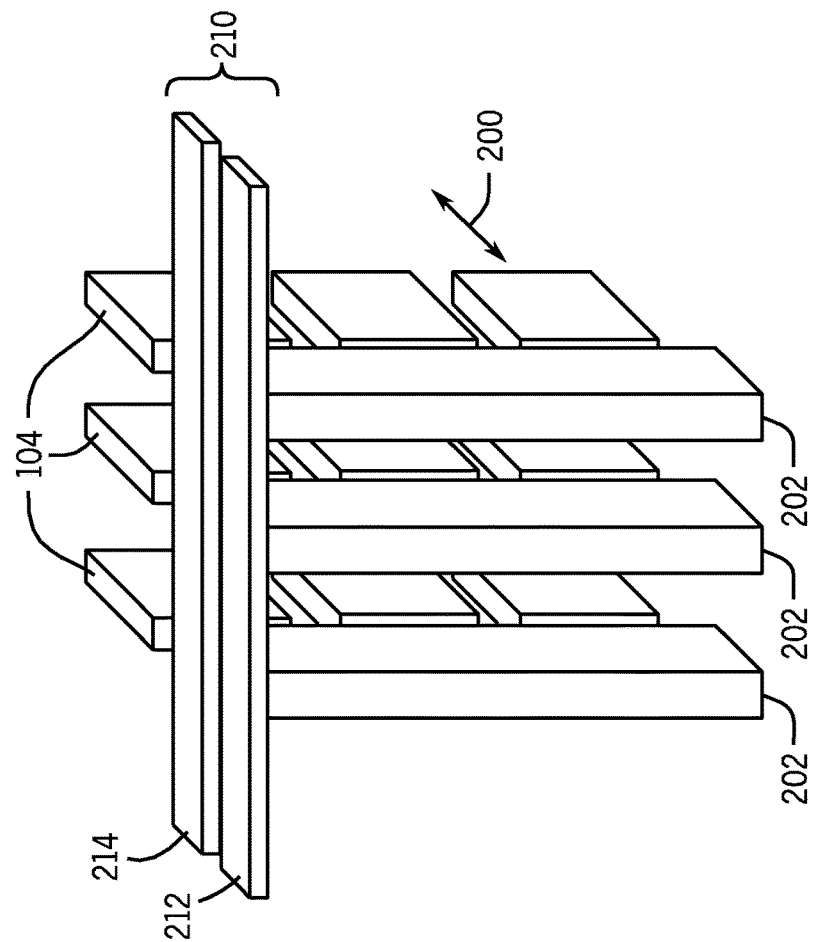
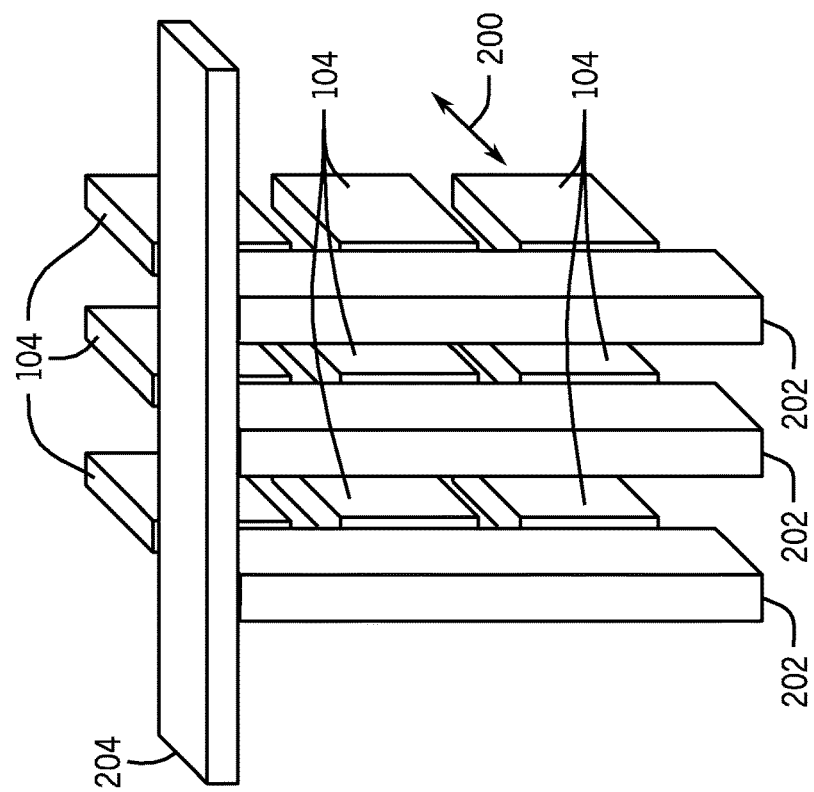

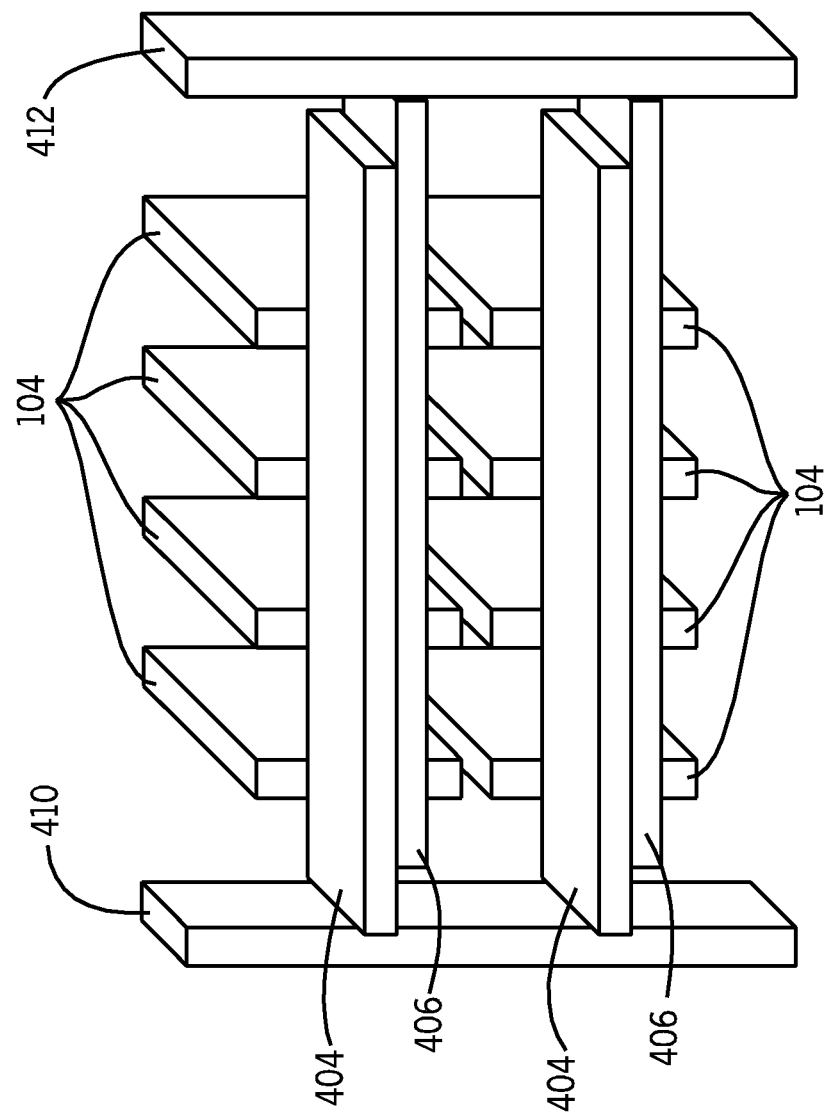

ately connect to the backplane infrastructure. In the ensuing discussion,
CONNECTOR MODULES TO OPTICALLY CONNECT TO ELECTRONIC DEVICES

CROSS REFERENCE TO RELATED APPLICATIONS

This is a continuation of U.S. Pat. No. 9,213,157, granted Dec. 15, 2015, which originated as U.S. application Ser. No. 14/361,185, filed May 28, 2014, which is a national stage application under 35 U.S.C. §371 of PCT/US2012/020438, filed Jan. 6, 2012, both hereby incorporated by reference.

BACKGROUND

A system can include multiple electronic devices. To allow communication with the electronic devices, a backplane infrastructure can be provided in the system, where the backplane infrastructure has connectors to connect with respective mating connectors of the electronic devices. The connectors of the backplane infrastructure can include optical connectors to optically connect to respective electronic devices.

BRIEF DESCRIPTION OF THE DRAWINGS

Some embodiments are described with respect to the following figures:

FIGS. 2A-2B, 4A-4C, and 5A-5B illustrate various example modular connector infrastructures for optically connecting electronic devices, according to various implementations;

DETAILED DESCRIPTION

Figure 1:
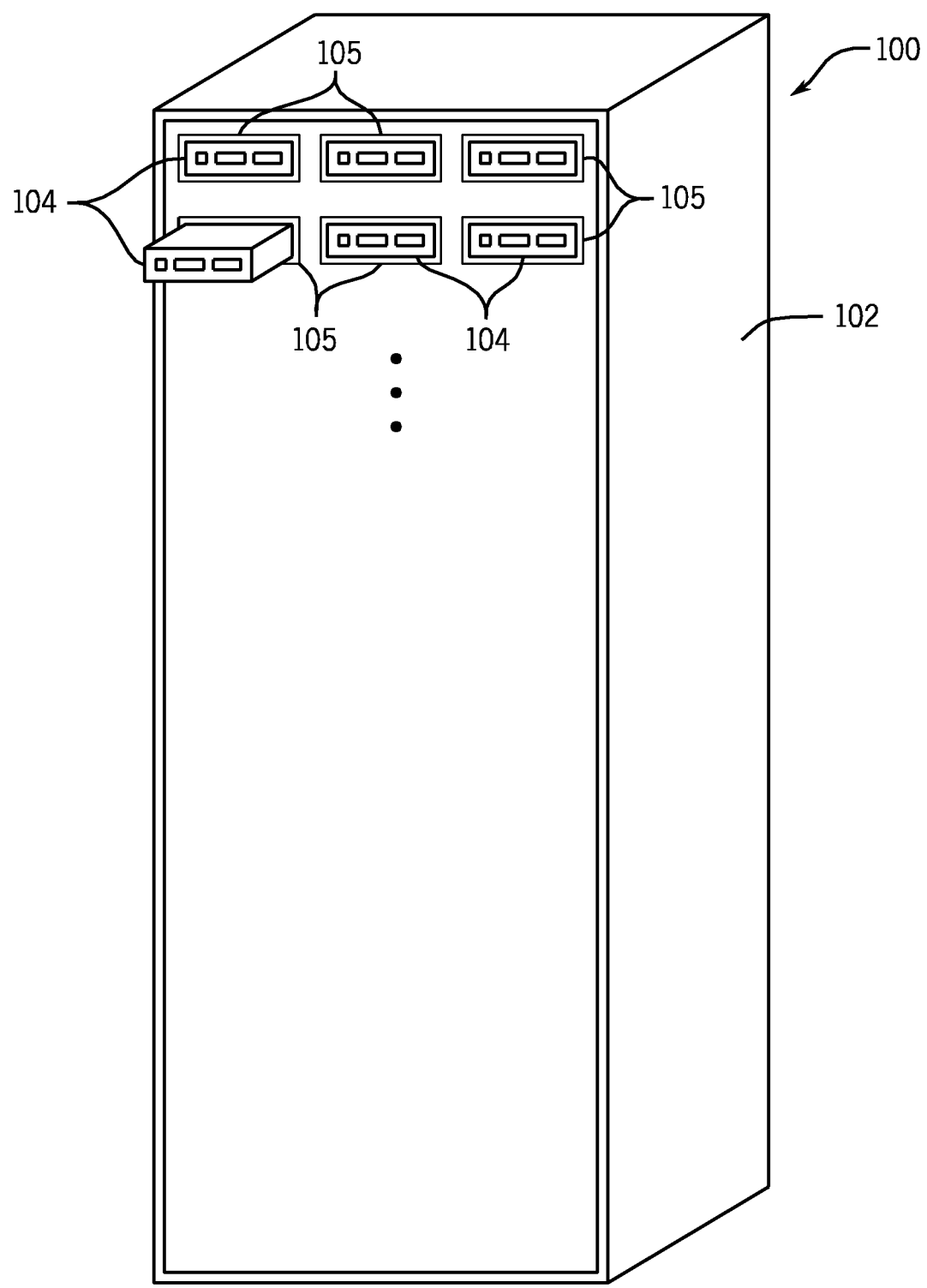
FIG. 1 is a schematic perspective view of a rack including electronic devices, according to some implementations.

Electronic devices, such as processing devices, storage devices, communications devices, management devices, and so forth, can be mounted in a rack, which includes a frame and other support elements for holding the electronic devices. The rack provides receptacles into which the electronic devices can be inserted. The rack can also include a backplane infrastructure for connection to the electronic devices that have been inserted into the rack. Generally, the backplane infrastructure can include a support structure to which connectors are attached. When electronic devices are mounted in the rack, connectors on the electronic devices can mate with connectors of the backplane infrastructure. The connectors of the backplane infrastructure are connected to communications media (e.g. optical fibers, electrical wires, etc.) to allow for communication among the electronic devices.

A backplane infrastructure can include optical connectors for optical connection with respective optical connectors of the electronic devices. It is noted that the electronic devices and the connector infrastructure can also include electrical connectors for electrically connecting the electronic devices to the backplane infrastructure. In the ensuing discussion, reference is made to just optical connectors—note, however, that it is to be understood that various components discussed below can also additionally include electrical connectors.

In some examples, a backplane infrastructure can include an integrated and fixed arrangement of optical connectors for connection to respective electronic devices. An integrated and fixed arrangement of optical connectors refers to an arrangement in which the optical connectors are affixed to a support structure of the backplane infrastructure such that the optical connectors are not separable from one another. This can present an issue when the backplane infrastructure is to be accessed for service (e.g. to repair a defective component) or upgrade (e.g. to replace a component). For example, to access the backplane infrastructure for service or upgrade, the electronic devices of the system may have to be dismounted, which disrupts system operation.

Also, the arrangement of the optical connectors on the backplane infrastructure can be for a specific system design, which means that a different backplane infrastructure having its respective different arrangement of optical connectors would have to be provided for a different system design. As a result, backplane infrastructures having integrated and fixed arrangements of optical connectors are associated with reduced flexibility.

To provide improved flexibility, a modular connector infrastructure according to some implementations is provided. The modular connector infrastructure includes multiple device connector modules that are independently and removably connected to respective subsets of electronic devices. The device connector modules are independently and removably connected to respective subsets of electronic devices if one of the device connector modules can remain connected to a first subset of electronic devices while another of the device connector modules is removed (or separated) from a second subset of electronic devices.

The modular connector infrastructure can also include interconnecting connector modules for optically interconnecting device connector modules; an interconnecting connector module can connect the device connector modules to each other. The interconnecting connector module is removably connected to the device connector modules.

Each connector module (device connector module or interconnecting connector module) includes optical connectors and optical communications media (e.g. optical fibers, optical waveguides, etc.) connected to such optical connectors. An optical connector can include optical elements (e.g. lenses, ferrules, etc.) to allow for communication of optical signals. The optical communications media allow for optical communications among the electronic devices in a rack. In some examples, the device connector modules and interconnecting modules can also include electrical connectors and electrical communications media.

The modularity of the modular connector infrastructure allows for a user to remove just the connector module(s) that is (are) to be serviced or upgraded, such that the remaining connector modules of the modular connector infrastructure can remain attached to respective electronic devices in the system. Additionally, the modularity of the modular connector infrastructure allows the arrangement of optical connectors to be easily changed for different system designs. For example, different systems can employ different connection topologies (e.g. star connection topology, mesh connection topology, etc.)—the arrangement and/or types of connector modules of the modular connector infrastructure can be flexibly and easily changed to accommodate the different system designs. As further examples, the modular connector infrastructure can be changed to achieve other system goals, such as to meet physical space specifications, power specifications, cooling specifications, signal bandwidth specifications, and so forth.

In addition to modularity, redundancy can also be provided with the modular connector infrastructure in accordance with some implementations. Redundancy can be provided by associating at least a pair of device connector modules with each subset of electronic devices. Thus, when one of the pair of device connector modules is detached from a given subset of electronic devices, the electronic devices in the given subset can continue to operate using the other device connector module in the pair. In this manner, during servicing or upgrade of a particular device connector module, the given subset of electronic devices does not have to be turned off, which allows for continued system operation. Note that redundant interconnecting connector modules can also be used—if one interconnecting connector module is removed for servicing or upgrading, the other, redundant interconnecting connector module can remain connected to the device connector modules to allow normal system operation to continue.

FIG. 1 illustrates an example system 100 that has a rack 102 that includes various electronic devices 104. The rack 102 includes an external chassis (or frame) containing receptacles 105 into which respective electronic devices 104 can be inserted. Although not shown in FIG. 1, the rear portion of the rack 102 includes a modular connector infrastructure having connector modules for connecting to electronic devices 104 that have been mounted in the rack 102.

FIG. 2A illustrates an example of the modular connector infrastructure according to some implementations. Electronic devices 104 can be arranged generally in an array (having rows and columns of electronic devices 104). Two types of connector modules are provided in the modular connector infrastructure of FIG. 2A. The first type includes device connector modules 202 that are connected to respective subsets of the electronic devices 104. In examples according to FIG. 2A, the device connector modules 202 are vertical device connector modules 202, where each vertical device connector module 202 is connected to a corresponding column of electronic devices 104.

Although the interconnecting connector module 204 is shown to have a horizontal orientation in examples according to FIG. 2A, note that in alternative examples, the interconnecting connector module 204 can have other orientations.

A second type of connector module includes an interconnecting connector module 204 for interconnecting the device connector modules 202. In this way, an electronic device 104 in a particular subset can optically communicate with another component (another electronic device 104 in another subset or a component that is within the rack) through the electronic device's device connector module 202 and the interconnecting connector module 204.

Note that the electronic devices 104 shown in FIG. 2A do not have to be the same type of electronic devices. There can be various different types of electronic devices 104 mounted in the rack 102 of FIG. 1. For example, some electronic devices can be processing devices (e.g. computers, processor nodes, etc.), while other electronic devices can be storage devices (e.g. hard disk drives, integrated circuit storage devices, etc.) and/or communications devices (e.g. switches, routers, etc.) and/or management devices (e.g. devices to manage other devices, such as to activate or deactivate devices, collect status or measurement information of devices, manage power or cooling of devices, etc.).

As a specific example, the first row of network devices 104 shown in FIG. 2A can include communications devices, while the second and third rows of electronic devices 104 shown in FIG. 2A can include processing devices. Each vertical device connector module 202 can connect the processing devices to the respective communications device, but the processing devices in each column are not connected to each other. Such an arrangement is referred to as the star topology, since each given communications device in a column is connected to its respective processing devices, but the processing devices are not connected directly to each other. In other arrangements, other connection topologies can be provided. For example, a mesh topology can be provided, where the electronic devices in a column can be connected to each other (e.g. processing devices can be connected to each other, or communications devices can be connected to each other).

Each of the electronic devices can include an optical interface coupled to the optical connector of the electronic device. The optical interface can convert between optical signals and electrical signals, where the electrical signals are used by various components (e.g. processor, input/output device, memory device, etc.) in the electronic device.

FIG. 2B illustrates a modular connector infrastructure according to different implementations. In FIG. 2B, device connector modules 202 are connected to respective columns of electronic devices 104 (similar to FIG. 2A). However, in FIG. 2B, a pair 210 of interconnecting connector modules 212 and 214 are provided (instead of just the single interconnecting connector module 204 in the FIG. 2A). The multiple interconnecting connector modules 212 and 214 are used to interconnect the device connector modules 202. In some examples, the multiple interconnecting connector modules 212 and 214 are redundant interconnecting connector modules (where one of the redundant interconnecting connector modules can allow for continued communications even if the other interconnecting connector module is removed or has failed).

In other examples, the multiple interconnecting connector modules 212 and 214 are not redundant interconnecting connector modules, but rather are connected in parallel to the device connector modules 202 to provide for increased communications bandwidth—for example, the interconnecting connector modules 212 and 214 are connected to the device connector modules 202 in a way that allows the interconnecting connector modules 212 and 214 to carry different sets of optical signals. In other examples, it is possible for the interconnecting connector module 212 to be connected at the top ends of the device connector modules 202, while the other interconnecting connector module 214 is connected at the bottom ends of the device connector modules 202.

The connector modules of the modular connector infrastructure depicted in FIG. 2A or 2B are accessible without having to remove the electronic devices 104 from the rack. In this way, a user can easily remove selected connector modules from the modular connector infrastructure to perform service or upgrades, or for changing the configuration of the modular connector infrastructure to provide a different system design.

Figure 3A:
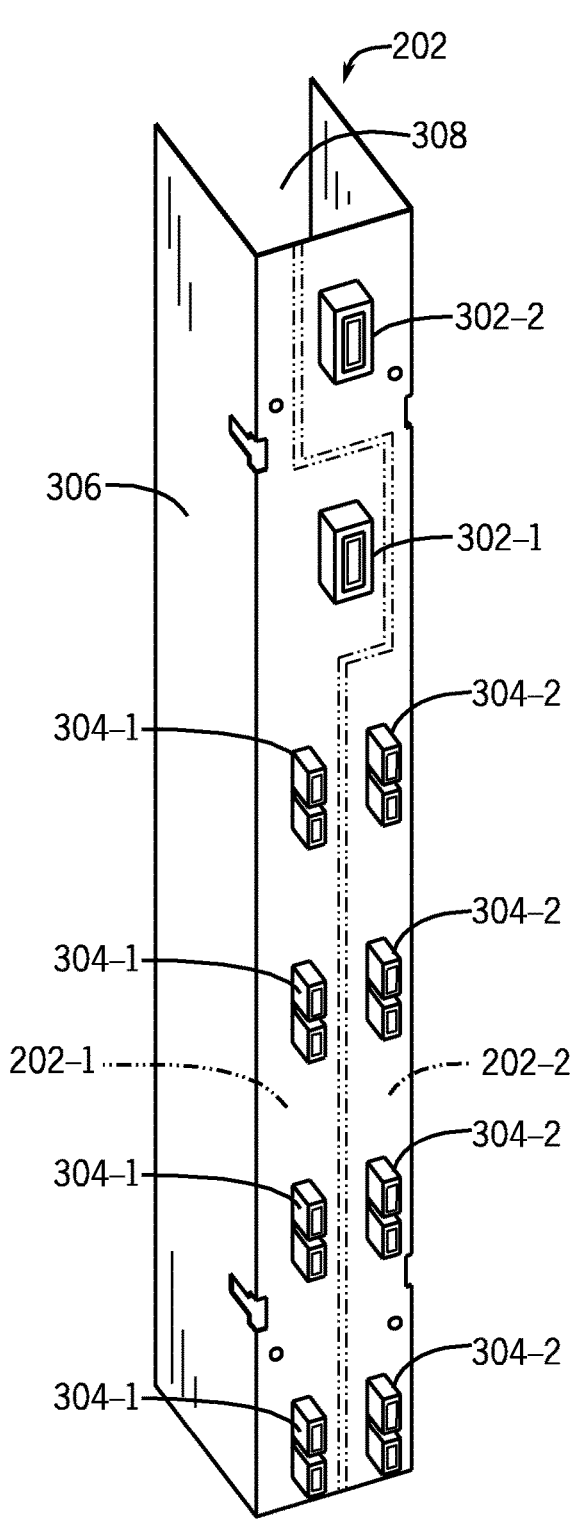
FIGS. 3A-3B illustrate an example connector module according to some implementations.
Figure 3B:
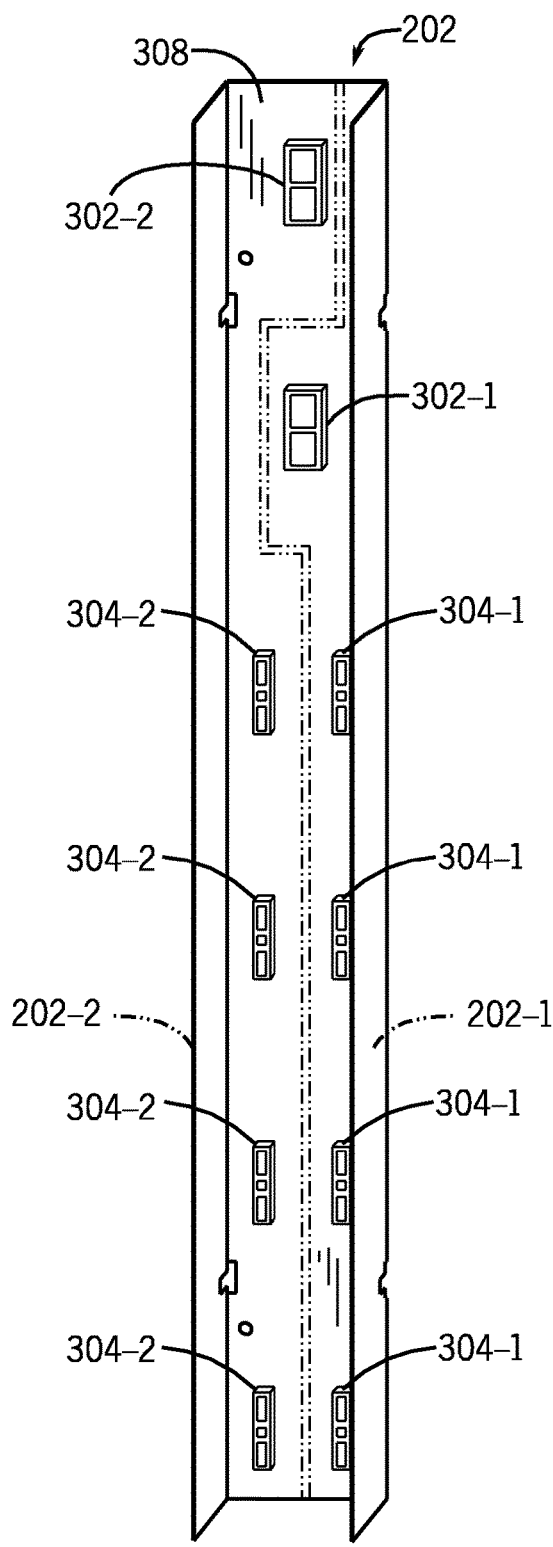

FIGS. 3A and 3B illustrate an example of a device connector module 202. FIG. 3A illustrates a front view of the device connector module 202, while FIG. 3B shows a rear view of the device connector module 202. Although reference is made to a "front view" or "rear view" with respect to FIGS. 3A and 3B, it is noted that from a different perspective, the view of FIG. 3A can be considered the rear view while the view of FIG. 3B is considered the front view.

The device connector module 202 has first type optical connectors 302-1, 302-2 and second type optical connectors 304-1, 304-2. In some examples, the first type optical connectors 302-1, 302-2 can be used to connect to first type electronic devices (e.g. communications devices). The second type optical connectors 304-1, 304-2 can be used to connect to second type electronic devices, such as processing devices or other types of devices.

The optical connectors 302-1, 302-2 and 304-1, 304-2 are mounted on a housing 306 of the device connector module 202. The housing 306 can be generally U-shaped, although in different examples, the housing 306 can have other shapes. The generally U-shaped housing 306 defines an inner chamber 308. Although not shown in FIG. 3B, optical communications media (e.g. optical fibers or optical waveguides) can be provided in the inner space 308 of the housing 306. The optical communications media are optically connected to corresponding optical connectors 302-1, 302-2 and 304-1, 304-2.

In some examples, the device connector module 202 is mounted into a rack (e.g. 102 in FIG. 1) by sliding the device connector module 202 into a respective receiving structure in the rack. As explained further below, this receiving structure can include a plenum that defines an elongated groove into which a device connector module can be inserted. Upon insertion of the device connector module 202 into the receiving structure in the rack, the optical connectors 302-1, 302-2 and 304-1, 304-2 (on the side of the support structure 306 depicted in FIG. 3A) are mated to respective optical connectors of corresponding electronic devices 104.

The optical connection between optical connectors of the device connector module 202 and optical connectors of electronic devices can include a blind-mate optical connection. A "blind-mate optical connection" refers to an optical connection in which one optical connector can be connected to another optical connector, with alignment between the connectors being automatically performed using alignment features, such that a user does not have to visually align connectors to make the connection.

Although FIGS. 3A-3B illustrate a specific configuration of a device connector module 202, note that an interconnecting connector module 204, 212, or 214 can have a similar configuration that includes a support structure, optical connectors mounted on the support structure, and optical communications media to optically interconnect the optical connectors. The optical connectors of the interconnecting connector module can also be blind-mated to the optical connectors of the device connector modules 202.

Figure 7:
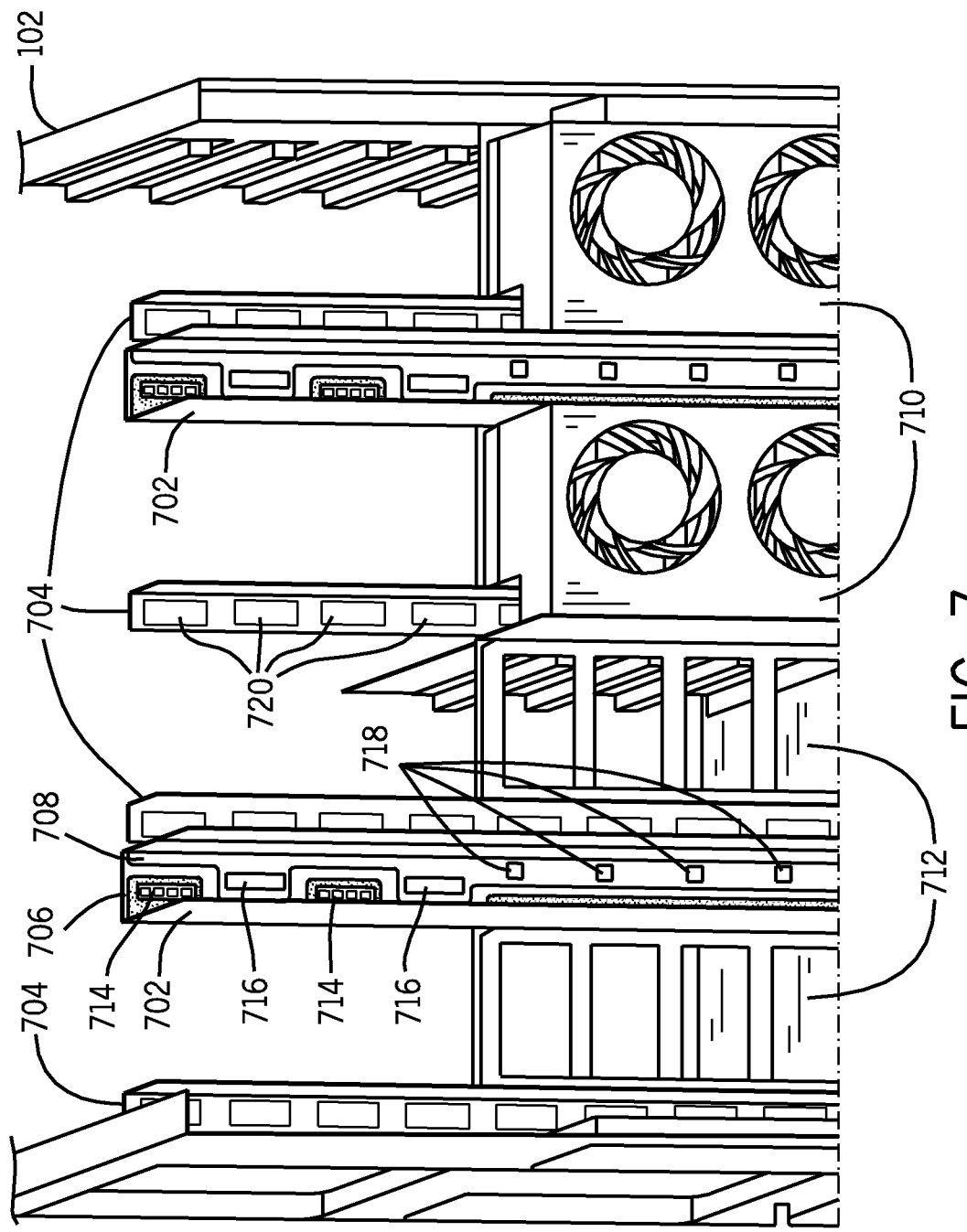

In other examples, instead of one integral device connector module 202, two separate device connector modules can be provided, with the two separate device connector modules divided by the dashed lines in FIGS. 3A-3B. These two separate device connector modules are designated as 202-1 and 202-2 in FIGS. 3A-3B. Each of the two separate device connector modules 202-1 and 202-2 can include its respective set of optical connectors (the device connector module 202-1 includes optical connectors 302-1 and 304-1, while the device connector module 202-2 includes optical connectors 302-2 and 304-2). A further example of separate device connector modules is depicted in FIG. 7, discussed further below. Employing two separate device connector modules instead of an integral device connector module can allow for redundancy to be provided, such that communication can be performed using one device connector module when the other device connector module fails.

Figure 4B:
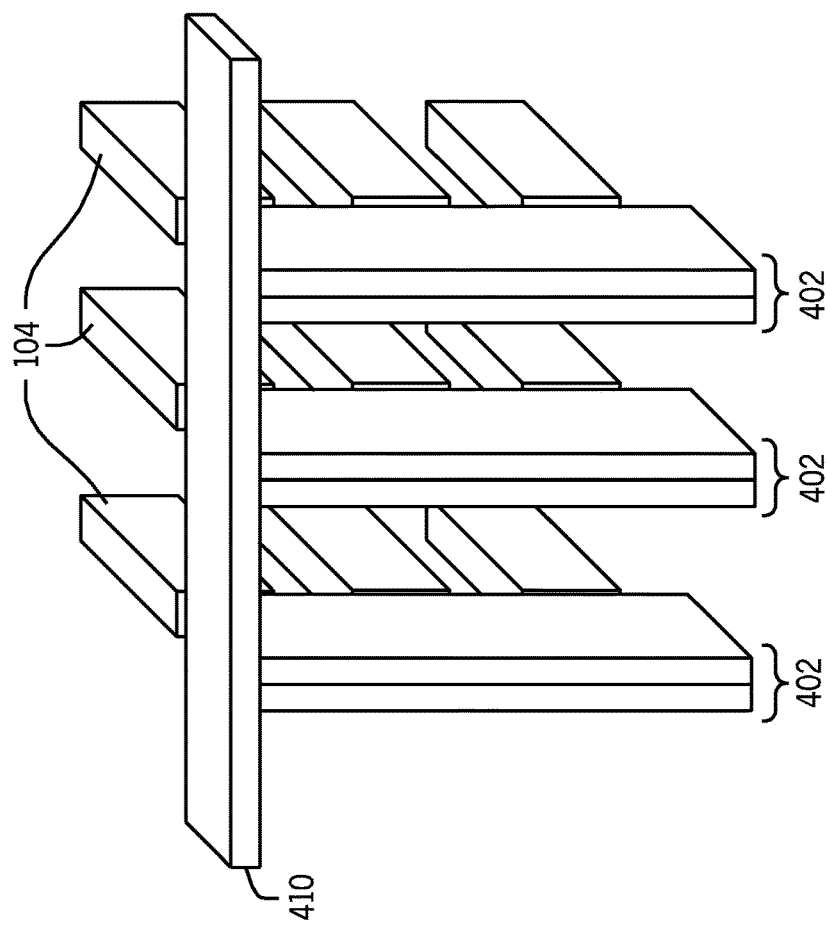
Figure 4A:
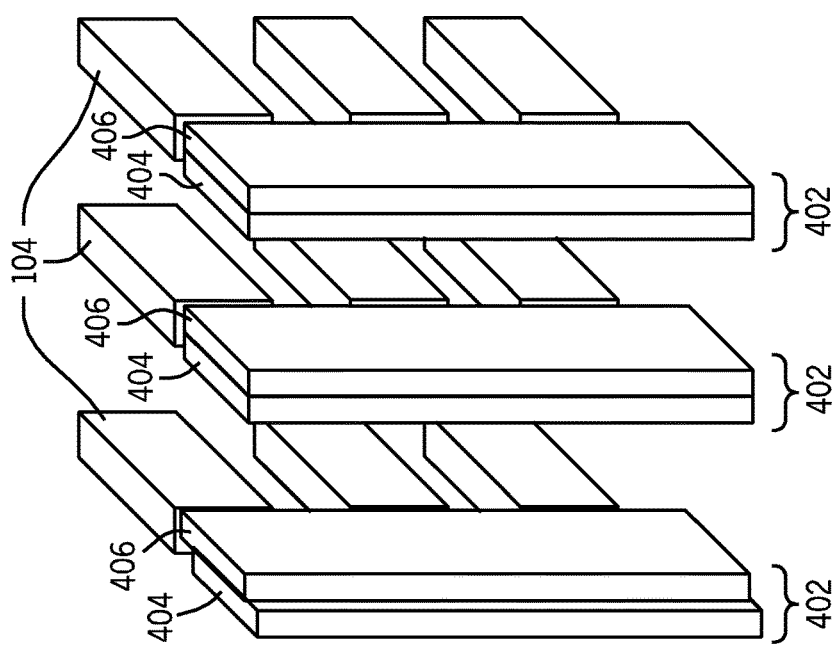

FIG. 4A illustrates another arrangement of a modular connector infrastructure, which includes pairs 402 of device connector modules for respective subsets (e.g. columns) of electronic devices 104. Each pair 402 includes redundant device connector modules 404 and 406 (that provide identical optical signal paths for the corresponding column of electronic devices 104). The presence of redundant device connector modules in each pair 402 allows for flexible service or upgrade of the device connector modules. For example, one device connector module of a pair 402 can be removed for service/upgrade, while system operation can continue using the other device connector module of the pair 402. For example, as shown in FIG. 4A, in the left-most pair 402 of device connector modules, the device connector module 404 is shown as being removed (disengaged) from its column of electronic devices 104 to illustrate that the connector module 404 can be removed for service or upgrade, while the device connector module 406 ion the pair 402 remains connected to the column of electronic devices 104.

FIG. 4B illustrates a variant of the modular connector infrastructure shown in FIG. 4A. In FIG. 4B, an interconnecting connector module 410 has been added that interconnects the pairs 402 of device connector modules. As yet a further variant, instead of just one interconnecting connector module 410, a pair of interconnecting connector modules can be used to interconnect the pairs 402 of device connector modules (similar to pair 210 shown in FIG. 2B).

FIG. 4C illustrates another example modular connector infrastructure, which includes horizontally arranged pairs of redundant device connector modules 404 and 406, where each pair of device connector modules 404 and 406 is optically connected to a respective row of electronic devices 104. FIG. 4C also shows a redundant pair of interconnecting connector modules 410 and 412. The interconnecting connector module 410 is optically connected to the device connector modules 404, while the interconnecting connector module 412 is optically connected to the device connector modules 406. The connector modules 406 and 412 provide a redundant optical path in case of failure of a connector module 404 or the interconnecting connector module 410. Similarly, the connector modules 404 and 410 provide a redundant optical path in case of failure of a connector module 406 or the interconnecting connector module 412.

In further examples, the device connector modules 404 and 406 can electrically connect to the electronic devices 104. In such examples, the device connector modules 404 and 406 can be electrically connected to interconnecting connector modules 410 and 412, or alternatively, the device connector modules 404 and 406 can have electrical-to-optical conversion circuitry to allow the device connector modules 404 and 406 to be optically connected to interconnecting connector modules 410 and 412. Note that similar electrical/optical connections can be employed in the other arrangements discussed above.

In the ensuing discussion, although reference is made to pairs of redundant connector modules, it is noted that in other implementations, sets of redundant connector modules can be provided, where each set can include two or more than two redundant connector modules (redundant device connector modules or redundant interconnecting connector modules).

Figure 5B:
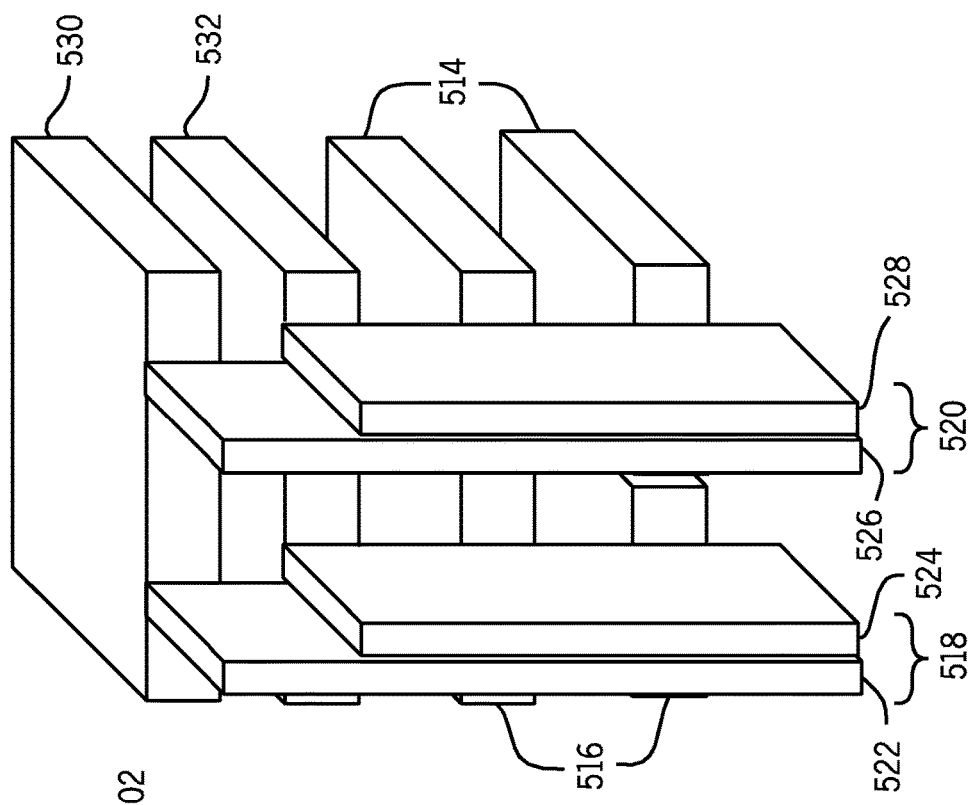
Figure 5A:
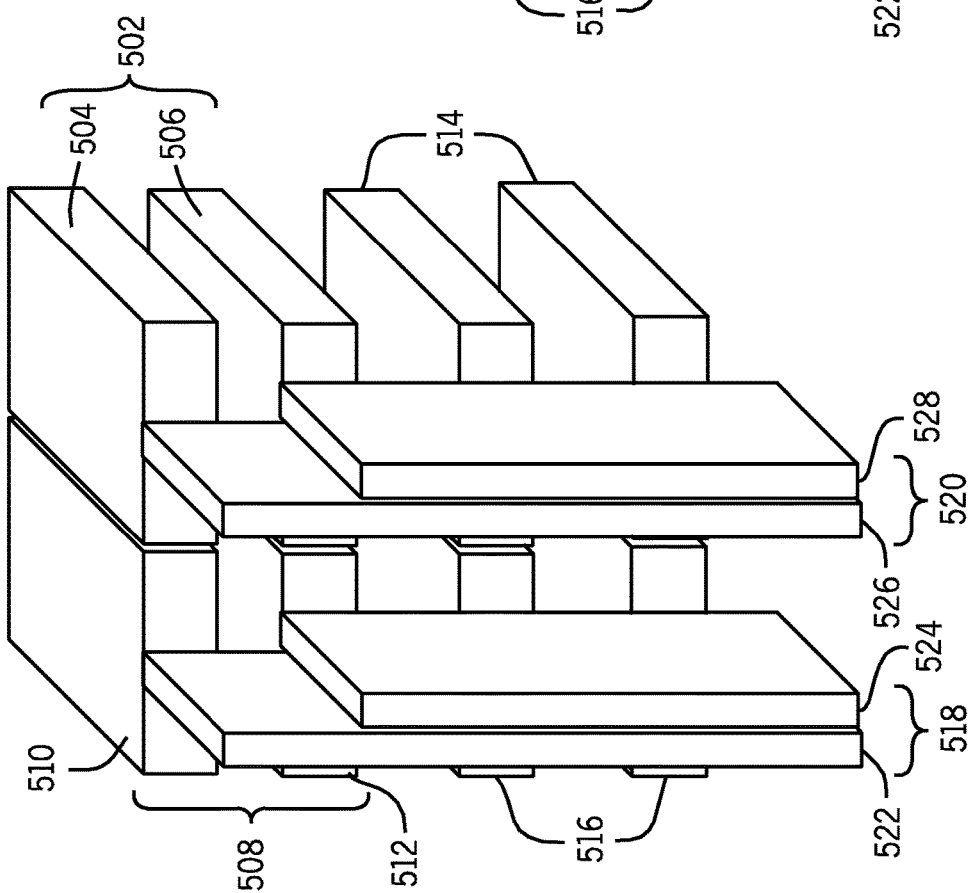

FIG. 5A shows an alternative example arrangement, which includes redundant electronic devices as well as redundant connector modules. The redundant electronic devices include a first pair 502 of communications devices 504 and 506, and a second pair 508 of communications devices 510 and 512. Processing devices 514 are optically connected to both the redundant communications devices 504, 506 in the pair 502, while processing devices 516 are optically connected to both communications devices 510 and 512 in the pair 508. FIG. 5A also shows two pairs 518 and 520 of device connector modules. The first pair 518 includes device connector modules 522 and 524, while the second pair 520 includes device connector modules 526 and 528.

The device connector module 522 connects the processing devices 516 to the communications device 510, while the device connector module 524 connects the processing devices 516 to the communications device 512. Similarly, the device connector module 526 connects the processing devices 514 to the communications device 504, while the device connector module 528 connects the processing devices 514 to the communications device 506.

Since the communications devices 510 and 512 are redundant communication devices, even if communication between the processing devices 516 to one of the communications devices 510 and 512 is lost (such as due to removal of either the device connector module 522 or 524 in the pair 518), system operation can continue since the processing devices 516 are still able to connect optically communicate with the other of the communications devices 510 and 512. Thus, for example, if the device connector module 522 were to be removed to cut off communication between the processing devices 516 and the communications device 510, the processing devices 516 would still be able to communicate through the device connector module 524 with the communications device 512.

FIG. 5B shows a different example arrangement, in which the four communications devices 504, 506, 510, and 512 of FIG. 5A are replaced with communications devices 530 and 532 in FIG. 5B. Each communications device 530 or 532 is wider than each of the communications devices 504, 506, 510, and 512, to allow for connection to two device connector modules rather than just one device connector module. For example, the communications device 530 is connected to both device connector modules 522 and 526, while the communications device 532 is connected to both device connector modules 524 and 528. The communications devices 530 and 532 can be redundant communications devices, where one communications device can be used when the other communications device is inaccessible by electronic devices, such as due to removal of one of the device connector modules.

Although not shown in FIG. 5A or 5B, an interconnecting connector module (or multiple interconnecting connector modules) can also be used for interconnecting the device connector modules 522, 524, 526, and 528. For example, one interconnecting connector module can be used to interconnect device connector modules 522 and 526, while another interconnecting connector module can be used to interconnect connector modules 524 and 528.

Figure 6:
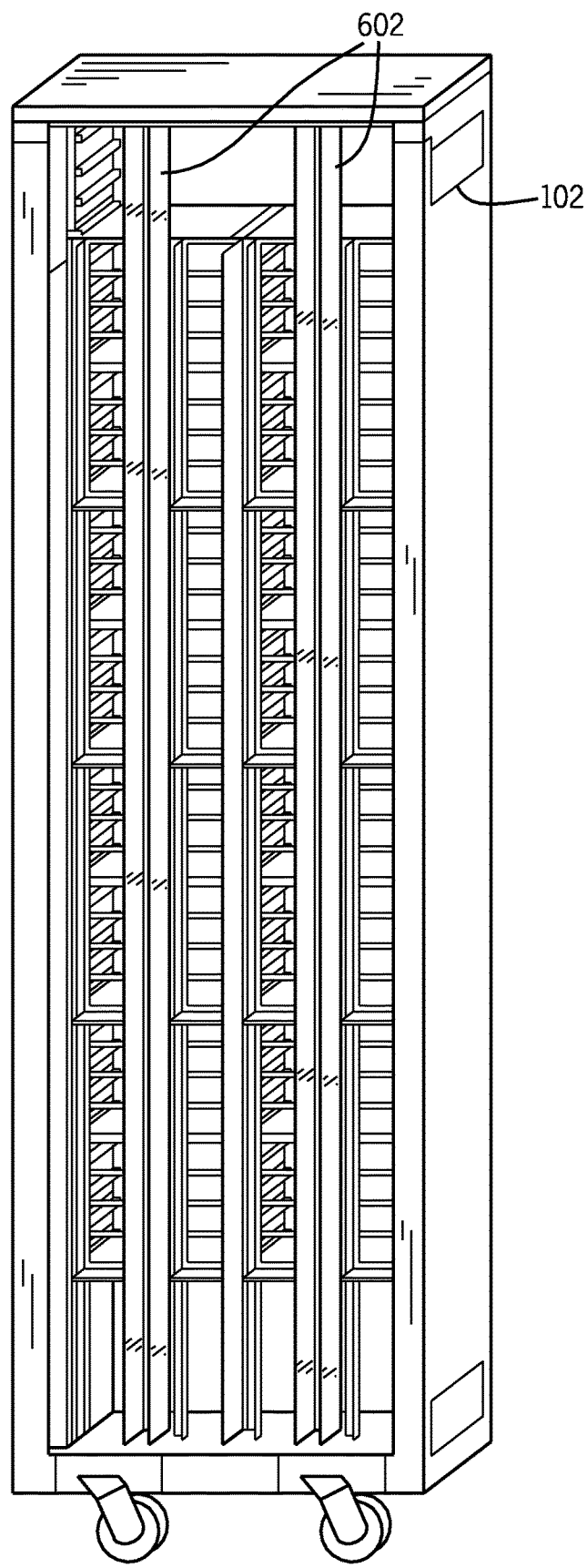
FIGS. 6 and 7 are rear views of example racks that include plenums for receiving connector modules according to some implementations.

FIG. 6 is a rear view of the rack 102 with the electronic devices 104 of FIG. 1 removed. The rear of the rack 102 includes plenums 602, where each plenum 602 defines an elongated groove arranged to receive one or multiple device connector modules, such as those shown in FIGS. 2A-5B.

FIG. 7 is a rear view of an alternative example arrangement of the rack 102. In FIG. 7, two types of plenums are provided, including first plenums 702 and second plenums 704. The first plenums 702 are used to receive device connector modules that are for communicating data signals, which can be relatively high-speed (high-frequency) signals. "Data signals" can refer to information that is communicated by electronic devices during normal operation.

The second plenums 704 are used to receive device connector modules for carrying management signals and power distribution. Management signals are signals used for managing electronic devices. In some examples, management signals can have reduced frequencies as compared to data signals, and there can be usually be a smaller amount of management signals as compared to data signals.

As shown in FIG. 7, two device connector modules 706 and 708 are received in the groove of each of the first plenums 702. The two device connector modules in each plenum 702 include a first device connector module 706 having optical connectors 714 (and other optical connectors not visible in the view of FIG. 7), and a second device connector module 708 having optical connectors 716 and 718. In examples according to FIG. 7, the optical connectors 714 and 716 of the two different device connector modules 706 and 708 are interleaved with respect to each other so they can be positioned closed to a center longitudinal location of the plenum 702.

Each plenum 704 receives device connector modules having its respective set of optical or electrical connectors 720.

Fan assemblies 710 can also be mounted in the rack 102. The fan assemblies 710 can be mounted in respective fan receptacles 712—the left-most two fan receptacles 712 are shown without their respective fan assemblies 710. The device connector modules in the plenums 704 can also carry power distribution and fan management signals for the fan assemblies.

Figure 8:
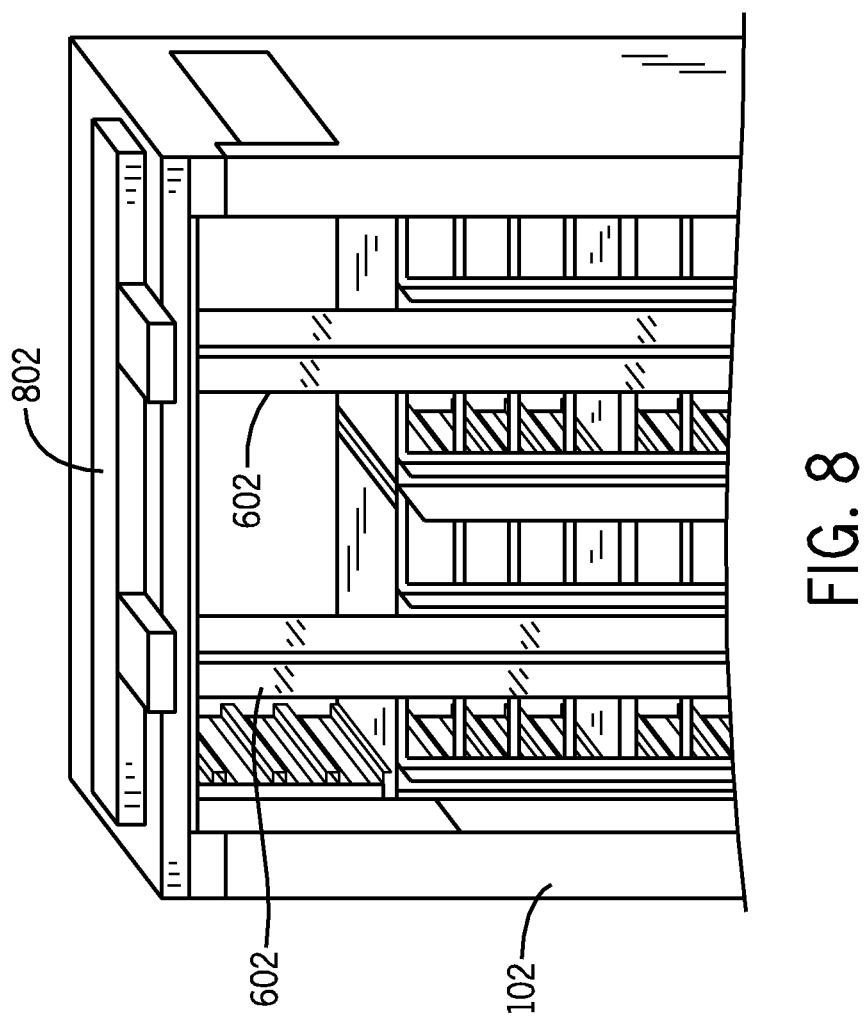
FIG. 8 is a rear view of an example rack having device connector modules interconnected by an interconnecting connector module, according to some implementations.

FIG. 8 illustrates another example arrangement of the rack 102. The rack 102 includes plenums 602 for receiving device connector modules to connect to corresponding electronic devices mounted in the rack. In addition, FIG. 8 shows an interconnecting connector module 802 for interconnecting the device connector modules in the plenums 602. This allows for intra-rack optical communications between the device connector modules, where electronic devices connected to one device connector module can communicate with electronic devices connected to another device connector module.

Although just one interconnecting module 802 is shown in FIG. 8, a different arrangement can include multiple interconnecting connector modules 802.

Figure 9:
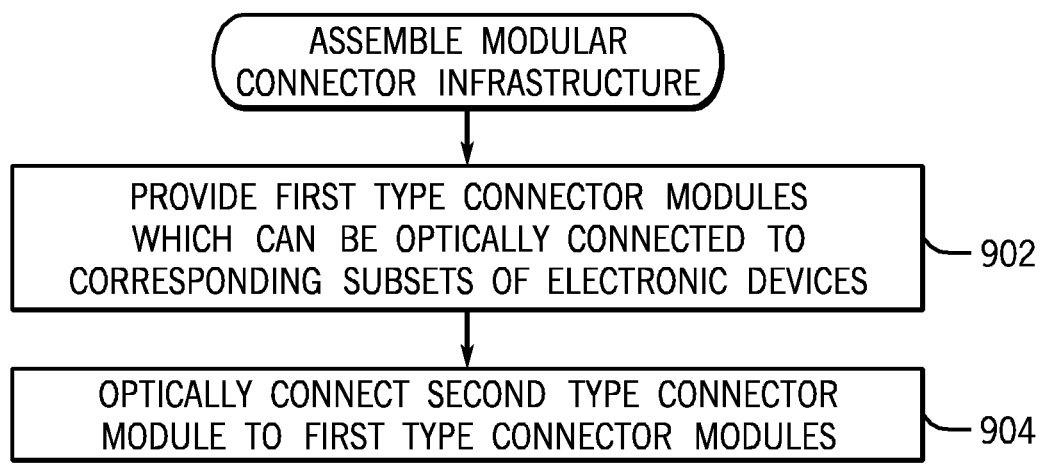
FIG. 9 is a flow diagram of a process of assembling a modular connector infrastructure, according to some implementations.

FIG. 9 is a flow diagram of a process of assembling a modular connector infrastructure, in accordance with some implementations. The process of FIG. 9 can be performed at a manufacturing facility of a modular connector infrastructure according to various implementations. Alternatively, the process of FIG. 9 can be performed by another entity for assembling a modular connector infrastructure.

The process includes providing (at 902) first type connector modules (e.g. device connector modules discussed above), which can be optically connected to corresponding subsets of electronic devices arranged in a rack. In some examples, each subset of electronic devices can be connected to a single first type connector module. In other examples, each subset of electronic devices is connected to a respective set of redundant first type connector modules.

The process of FIG. 9 further optically connects (at 904) at least one second type connector module (e.g. interconnecting connector module discussed above) to optically interconnect the first type connector modules.

With modular connector infrastructures according to various implementations, a flexible modular design of a backplane infrastructure is provided, that allows for the modular connector infrastructures to be relatively easily serviced, upgraded, or modified. The modular connector infrastructure is also scalable to support either a full arrangement of electronic devices in a rack or a partial arrangement of electronic devices in a rack.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A modular connector infrastructure comprising:
   device connector modules each having optical connectors to optically connect to respective electronic devices in a system;
   a first interconnecting connector module optically interconnected to the device connector modules; and
   a second interconnecting connector module optically interconnected to the device connector modules, the first and second interconnecting connector modules being redundant interconnecting modules, wherein continued communications between the electronic devices is allowed through one of the first or second interconnecting connector modules when another of the first or second interconnecting connector modules is removed or has failed,
   wherein the device connector modules are removably connected to the electronic devices, and the first and second interconnecting connector modules are removably connected to the device connector modules.

2. The modular connector infrastructure of claim 1, wherein the device connector modules are to optically connect to corresponding subsets of electronic devices, the modular connector infrastructure further comprising additional device connector modules having optical connectors to optically connect to the corresponding subsets of electronic devices, wherein each of the subsets of electronic devices is optically connected to a corresponding set of redundant connector modules.

3. The modular connector infrastructure of claim 1, wherein the removable connection of the device connector modules to the electronic devices allows for replacement of at least one of the device connector modules with a different device connector module to perform one of servicing, upgrade, and modification of a design of the module connector infrastructure.

4. The modular connector infrastructure of claim 1, wherein each of the device connector modules provides one of a star topology connection and mesh topology connection for the corresponding subset of electronic devices.

5. The modular connector infrastructure of claim 1, wherein the device connector modules and the interconnecting connector module provide a communication path between a first of the electronic devices and a second of the electronic devices.

6. A system comprising:
   a rack; and
   a modular connector infrastructure in the rack and comprising:
      first device connector modules having optical connectors to optically connect to electronic devices, wherein the first device connector modules are independently and removably connected to the electronic devices;
      second device connector modules having optical connectors to optically connect to the electronic devices, wherein the second device connector modules are independently and removably connected to the electronic devices and provide redundancy for corresponding ones of the first device connector modules;
      a first interconnecting connector module optically interconnected to at least some of the first and second device connector modules; and
      a second interconnecting connector module optically interconnected to at least some of the first and second device connector modules, the first and second interconnecting connector modules being redundant interconnecting modules, wherein continued communications between the electronic devices is allowed through one of the first or second interconnecting connector modules when another of the first or second interconnecting connector modules is removed or has failed.

7. The system of claim 6, wherein the first device connector modules are optically connected to respective subsets of the electronic devices, and wherein each of the subsets is further connected to a corresponding one of the second device connector modules.

8. The system of claim 6, wherein the rack has plenums defining grooves to receive corresponding first and second device connector modules.

9. The system of claim 6, further comprising:
   plenums defining grooves to receive respective pairs of the first and second device connector modules.

10. A method of assembling a modular connector infrastructure, comprising:
   providing device connector modules for optical connection to a plurality of electronic devices in a rack, wherein the device connector modules are independently and removably connected to the plurality of electronic devices, and wherein each of the device connector modules has optical connectors to optically connect to respective electronic devices of the plurality of electronic devices;
   optically connecting a first interconnecting connector module to the device connector modules, wherein the first interconnecting connector module is removably connected to the device connector modules; and
   optically connecting a second interconnecting connector module to the device connector modules, wherein the second interconnecting module is removably connected to the device connector modules, and wherein the first and second interconnecting connector modules are redundant interconnecting modules, wherein continued communications between the electronic devices is allowed through one of the first or second interconnecting connector modules when another of the first or second interconnecting connector modules is removed or has faded.

11. The method of claim 10, wherein the device connector modules and the interconnecting connector module provide a communication path between a first of the electronic devices and a second of the electronic devices.

12. The method of claim 10, wherein each of the device connector modules provides one of a star topology connection and mesh topology connection for the corresponding electronic devices.

13. The method of claim 10, wherein the rack has plenums defining grooves to receive corresponding device connector modules.

* * * * *